(12) United States Patent
La Croix

(10) Patent No.: US 8,371,391 B2
(45) Date of Patent: Feb. 12, 2013

(54) THRUSH AND WHITE LINE MEDICINAL DELIVERY SYSTEM

(75) Inventor: Cindi Michelle La Croix, Scottsdale, AZ (US)

(73) Assignee: Veterinary Preference LLC, Scottsdale, AZ (US)

( * ) Notice: Subject to any disclaimer, the term of this patent is extended or adjusted under 35 U.S.C. 154(b) by 611 days.

(21) Appl. No.: 12/470,176

(22) Filed: May 21, 2009

(65) Prior Publication Data

US 2009/0238894 A1  Sep. 24, 2009

Related U.S. Application Data

(63) Continuation of application No. 11/426,491, filed on Jun. 26, 2006, now Pat. No. 7,537,063.

(51) Int. Cl.
*A01L 15/00* (2006.01)

(52) U.S. Cl. ............................................. 168/2; 168/27

(58) Field of Classification Search ................ 168/2, 27; 606/212, 11
See application file for complete search history.

(56) References Cited

U.S. PATENT DOCUMENTS

| | | | | | |
|---|---|---|---|---|---|
| 3,731,686 | A | * | 5/1973 | Chatterjee | 604/376 |
| 4,071,955 | A | * | 2/1978 | Julius | 433/136 |
| 5,079,004 | A | * | 1/1992 | Blank et al. | 424/404 |
| 7,205,026 | B2 | * | 4/2007 | Groeger et al. | 427/314 |
| 2001/0036904 | A1 | * | 11/2001 | Nier et al. | 504/151 |
| 2005/0121205 | A1 | * | 6/2005 | Kelly | 168/4 |

* cited by examiner

*Primary Examiner* — Son T Nguyen

(57) ABSTRACT

An equine medicinal delivery system includes a dental roll impregnated with a medicinal solution for placement in an equine hoof. Another embodiment of an equine medicinal delivery system includes a pledget impregnated with a medicinal solution for placement in an equine hoof. A method of manufacturing an equine medicinal delivery system includes providing copper sulfate powder, combining water with the copper sulfate power to form a solution, and impregnating an applicator device with the solution. A method of manufacturing an equine medicinal delivery system includes providing an applicator device impregnated with a medicinal solution for placement in an equine hoof.

17 Claims, 4 Drawing Sheets

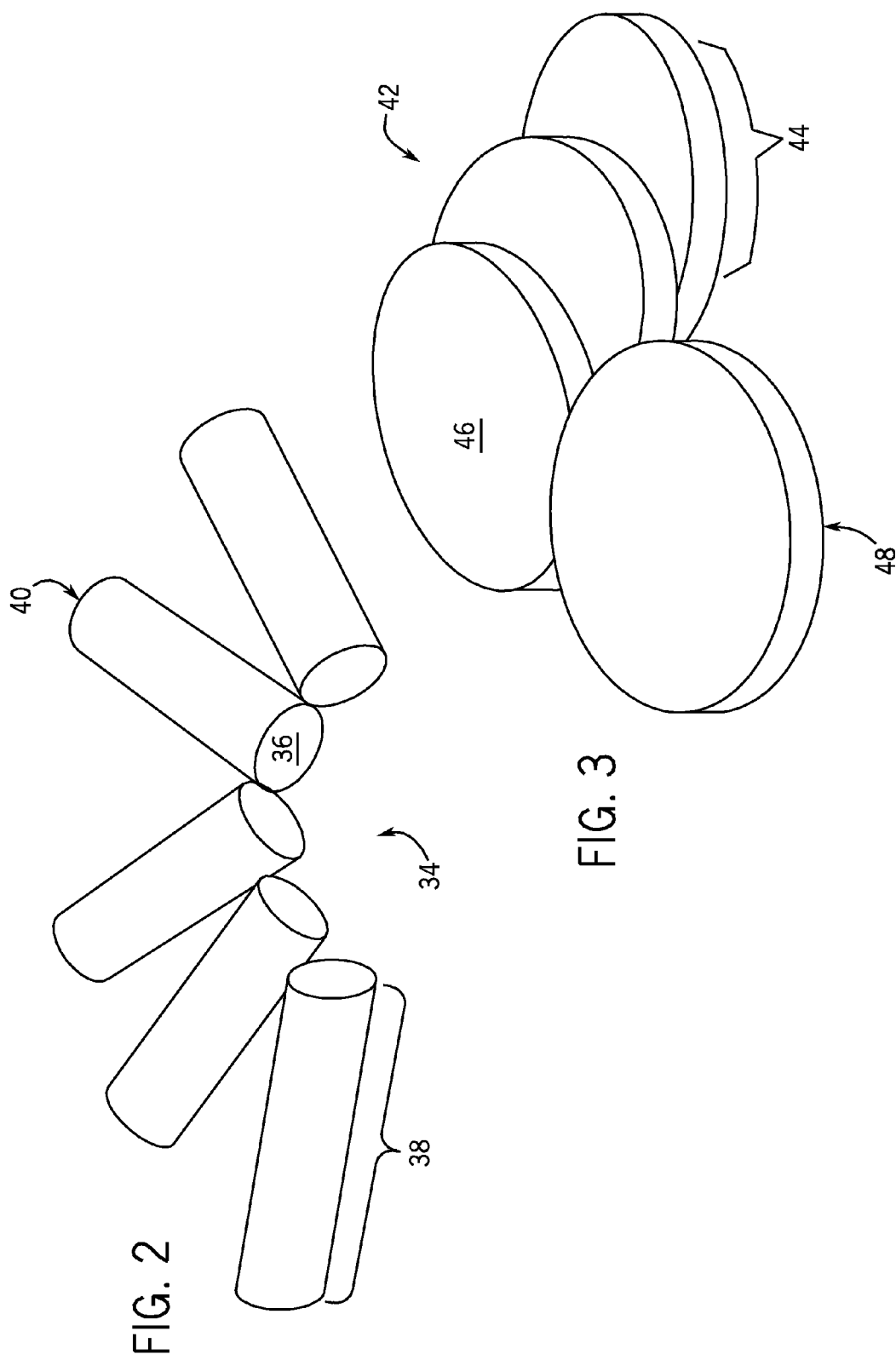

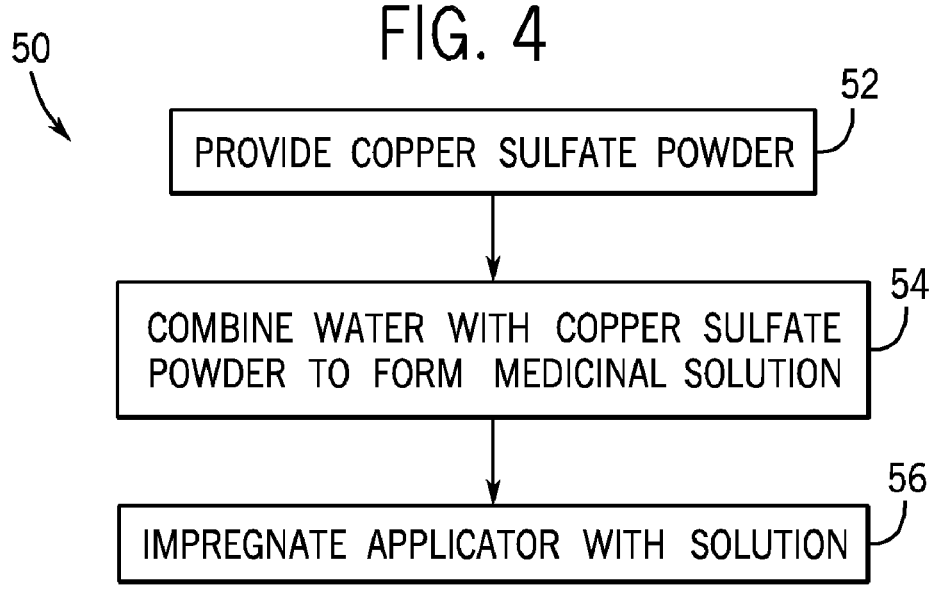
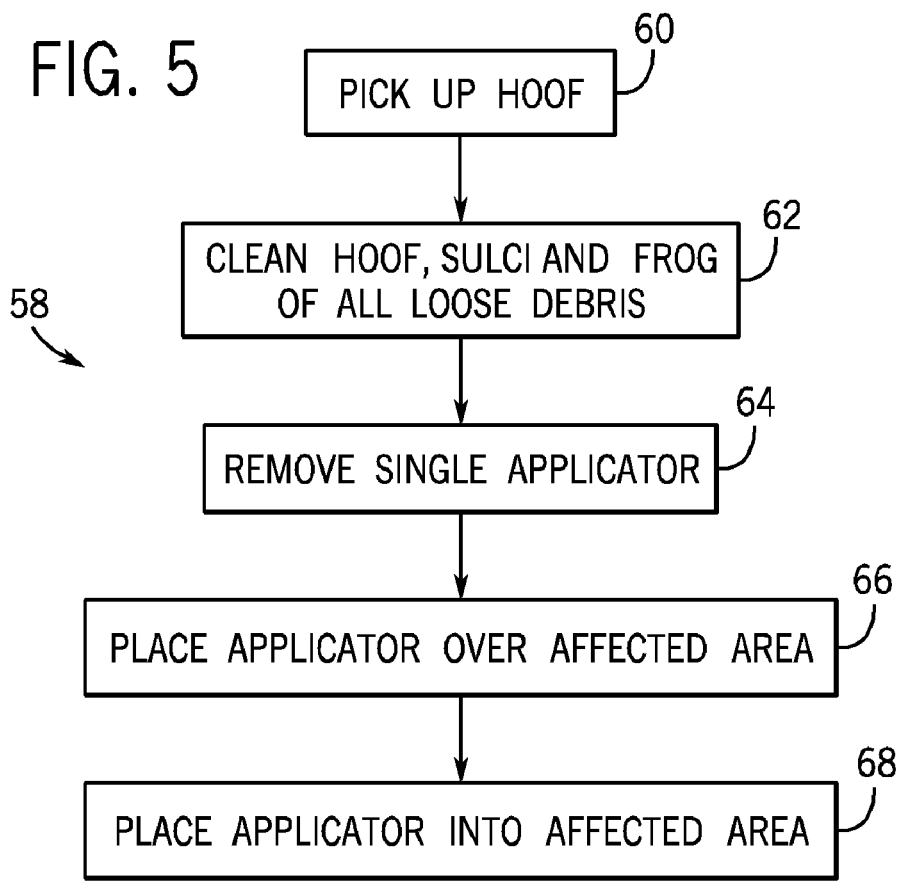

THRUSH AND WHITE LINE MEDICINAL DELIVERY SYSTEM

CROSS-REFERENCE TO RELATED APPLICATIONS

This application is a continuation of, and claims priority to, U.S. application Ser. No. 11/426,491, filed on Jun. 26, 2006 now U.S. Pat. No. 7,537,063, entitled "Thrush and White Line Medicinal Delivery System," which is incorporated herein by reference.

FIELD OF THE INVENTION

The present invention relates in general to veterinary medical devices and, more particularly, to an equine medicinal delivery system to treat Thrush and White Line diseases.

BACKGROUND OF THE INVENTION

Thrush is a moist exudative dermatitis that specifically involves the areas around the frog on the sole and heel surface of a horse's hoof. White Line Disease is a breakdown of the integrity of the white line area on a horse's hoof. Thrush and White Line Disease are caused by bacteria and/or fungal development in the affected areas.

Treatment of Thrush and White Line Disease involves keeping the foot dry, cleaning of any discharge or debris from the affected area, and the administration of an appropriate antiseptic or astringent.

Current therapies for Thrush and White Line Disease are aimed at treating the condition with antibacterial/antifungal agents. In the case of Thrush, the products currently available are present in liquid form. The products are generally dark blue to purple in color which stains skin, clothing, and cement. Since the products are not self retaining, the foot has to be held up until the product dries, a process which takes several minutes. Current treatments for White Line Disease also exist in a liquid form.

In order to place enough of the current products into the hoof to treat the entire affected area, leakage and dribbling will occur without fail. In some cases, the leakage out of the hoof stains the caregiver's skin and clothes and the horse's hoof. Even with a product which stains, current products must stay in contact with the affected areas long enough to be effective. Therefore, most of the products are not only messy but have to be applied for 10-14 days to be effective.

Accordingly, a need exists for a method to effectively administer a medicinal solution for treatment of Thrush and White Line Disease without the accompanying drawbacks previously described.

SUMMARY OF THE INVENTION

In one embodiment, the present invention is an equine medicinal delivery system, comprising a dental roll impregnated with a medicinal solution for placement in an equine hoof.

In another embodiment, the present invention is a equine medicinal delivery system, comprising a pledget impregnated with a medicinal solution for placement in an equine hoof.

In still another embodiment, the present invention is a method of manufacturing an equine medicinal delivery system, comprising providing copper sulfate powder, combining water with the copper sulfate powder to form a solution, and impregnating an applicator device with the solution.

In still yet another embodiment, the present invention is a method of manufacturing an equine medicinal delivery system comprising providing an applicator device impregnated with a medicinal solution for placement in an equine hoof.

BRIEF DESCRIPTION OF THE DRAWINGS

FIG. 2 illustrates a dental or cotton roll structure;
FIG. 3 illustrates a pledget structure;
FIG. 4 illustrates an example method of preparing a medicinal solution to treat Thrush and White Line Disease;
FIG. 5 illustrates an example method of application of the medicinal solution to an affected area.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
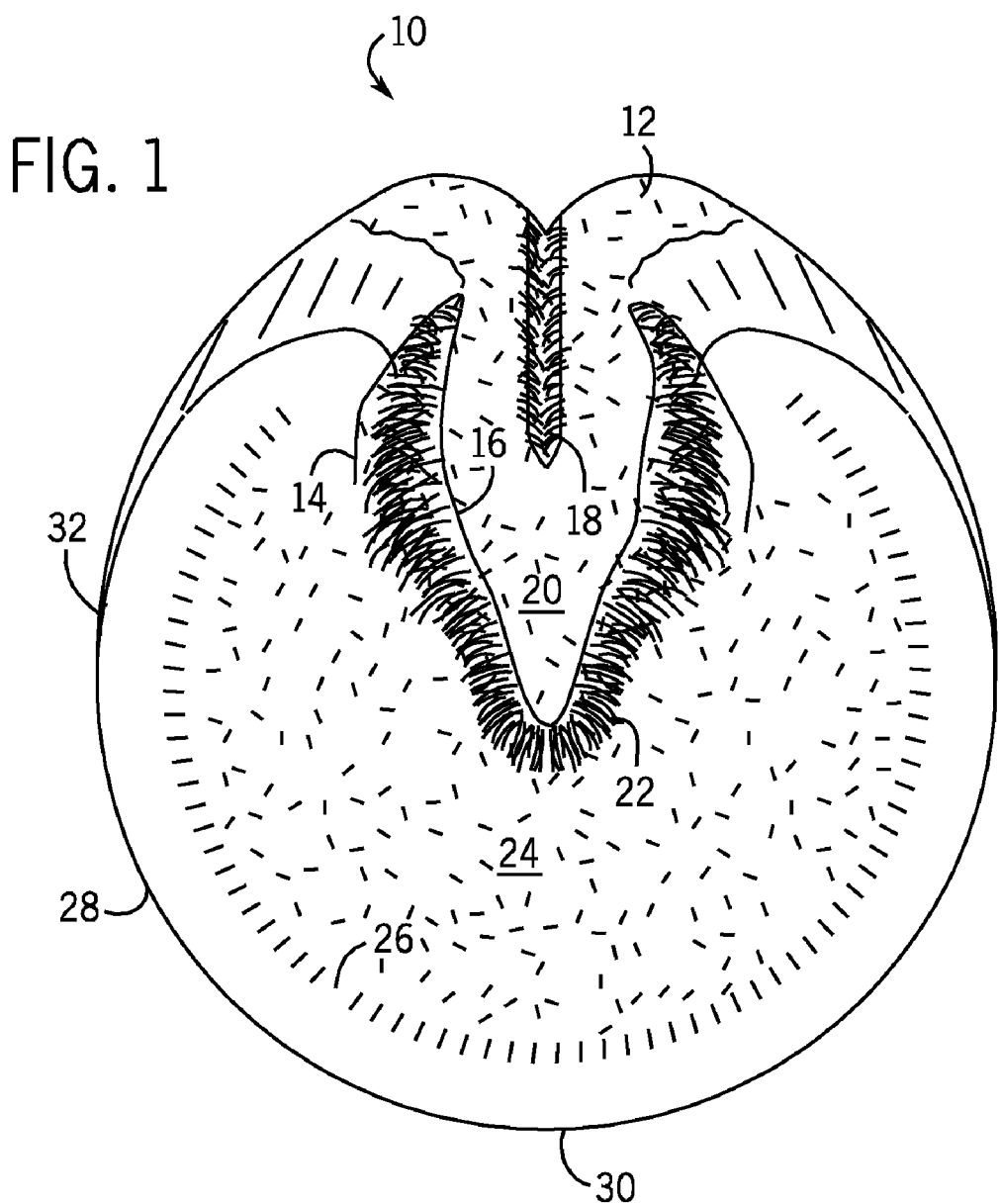
FIG. 1 illustrates physiological aspects of an equine foot.

Turning to FIG. 1, physiological aspects of an equine foot 10 or hoof 10 are depicted. Three major regions of the foot 10 include wall 28, frog 20 and sole 24. When the foot 10 is in its normal position the wall 28 can be seen on the medial, lateral and dorsal aspect. Wall 28 can be divided topographically into the toe 30, the quarters 32 and the heels 12. Wall 28 at the heels 12 is reflected onto wall 28 at the angles, where wall 28 forms the bars 14. Bars 14 are convergent ridges which fade out before bars 14 meet centrally.

Fitting between the bars 14 is the second major region of the hoof, a structure called the frog 20. Frog 20 has an apex 22 pointing dorsally between the bars 14, and a central sulcus 18 flanked by two crura. The furrow between the crus and the bar 14 in each half of the hoof 10 is called the collateral sulcus 16. That part of the frog opposite to the apex expands and forms the bulbs of the heels 12. Bulbs of the heels 12 separate the heels of the wall 28. The remainder of the ground surface, dorsal to the bars 14 and the apex 22 of the frog 20 and enclosed by the wall 28 of the hoof 10, is the third region of the hoof 10, the sole 24. A non-pigmented region known as the white line 26 or white zone 26 is shown just central to the wall 28.

When the animal moves, the frog 20 is the first part of the foot 10 to be replaced on the ground. The elastic nature of frog 20 serves to dampen concussion. Farriers, when trimming the foot and applying shoes, must be cognizant of the white line 26. Structures central to white line 26 will be sensitive and vascular since the structures may be dermal. Structures outside the white line 26 will be insensitive since the structures are epidermal. Any nails driven inside the white line are likely to cause pain to the animal. The nails also will possibly (and more importantly) cause infection in the hoof.

Again, as previously described, equine Thrush is a moist exudative dermatitis that specifically involves the areas around the frog 20 on the sole 24 and heel surface of a horse's hoof 10. Thrush has a characteristic black, odorous discharge caused from bacterial proliferation. The bacteria can create enough damage to sensitive tissues that the animal may experience pain as well as lameness.

Horses acquire thrush by a lack of proper trimming and foot care. Increased depth of the crevices of the bottom of the foot (sulci), particularly around the frog 20 allows packing of organic material in the foot 10. A poor hoof 10 care maintenance program contributes greatly to Thrush. Organic material which packs around the frog 20, such as an accumulation of moist sawdust or manure will create an environment in which excessive bacterial development occurs. Keeping the hoof 10 dry and cleaned out on a daily basis helps to prevent the disease.

The first symptom of Thrush a caregiver may notice is a foul odor when cleaning the hoof 10. As symptoms progress, a blackened, moist discharge or blackened necrotic (dead) tissue may be present in sulci 16, 18. If the condition has progressed sufficiently, the animal may show evidence of lameness or tenderness when the feet 10 are being picked out or when the animal is asked to move.

Treatment for Thrush is directed at keeping the foot 10 dry, cleaned of any discharge or debris and followed by an appropriate antiseptic or astringent.

Again, the white line 26 is an area on the horse's hoof 10 that is at the juncture of the hoof wall 28 and the sole 24. The white line 26 is the bond between the hoof wall 28 and underlying structures. When the hoof 10 is examined from the bottom of the sole 24, the area is readily seen. White Line Disease is a breakdown of the integrity of the white line 26 by bacterial and/or fungal invaders.

Multiple causes of White Line Disease have been proposed. Excessive moisture which softens the hoof 10 may allow easier entry of bacteria into the white line 26. Excessive drying of hoofs 10 may cause cracking in the hoof 10, allowing pathogens in. Mechanical factors may also play a roll, such as hoof 10 imbalances, excessive toe 30 length or other factors, which would initiate damage to the junction of the hoof wall 28 and sole 24.

The end-result of White Line Disease is a hoof 10 in which the outer wall 28 separates from the underlying tissues. Damage such as this destroys the strength and integrity of the hoof wall 28, leading to lameness and poor performance.

The first noted signs of White Line Disease are typically a separation found on the bottom of the foot 10 between the hoof wall 28 and sole 24. The area may appear to have powdery consistency as opposed to the normal, firm white line 26. The white line 26 will be wider and have a chalky texture. As the disease progresses, more and more of the hoof wall 28 may have been undermined. The sole 24 may be tender to a hoof tester and a deadened or hollow sound may be noted when the outer hoof wall 28 is tapped with a hammer. Often, White Line Disease will go undetected until the animal becomes lame.

The existing treatment for White Line Disease is to correctly trim and debride all affected tracts and fissures, which necessarily requires removal of the overlying unhealthy hoof wall 28. Medical therapy follows hoof wall 28 resection. Disinfectant is applied. A change in environment is important as well as proper shoeing. The foot must be kept dry.

To provide for an effective delivery system for a medicinal solution to treat Thrush or White Line Disease, an applicator device can be constructed which can be impregnated with the medicinal solution. The applicator device can be shaped such that the device can be self-retaining, thereby staying in contact with the damaged tissue until fungi or bacterial invaders are eliminated. The device can be impregnated with a medicinal solution that does not stain.

Turning to FIG. 2, an applicator device 34 consisting of a cotton roll 34 or dental roll 34 is depicted. Roll 34 is essentially cylindrical in form, having a flat first surface 36, a rounded, elongated surface 38, and a flat third surface 40. Roll 34 can be comprised of natural fibers such as cotton or wool, or can be comprised of synthetic fibers which are designed to effectively absorb and/or transfer medicinal solution to affected tissue. Rolls 34 can include dental rolls 34 which are generally found and manufactured in the art. In one embodiment, dental rolls measure approximately 10 mm by 38 mm.

Roll 34 can be designed such that surfaces 36, 40 are wide to an extent that the roll 34 fits snugly into the sulci 16, 18 of hoof 10 to be self-retaining. As a result, roll 34 can stay in contact with damaged tissue where liquids would dribble off the surface of hoof 10 and contact is limited to the amount of liquid absorbed as the medicinal solution runs off the hoof 10.

FIG. 3 shows a second applicator device 42 consisting of a pledget device 42. Pledget 42 comprises an applicator pad having substantially flat top surface 46, curved side surface 44 and substantially flat bottom surface 48. Again, pledget 42 can be comprised of natural fibers such as cotton or wool, or can be comprised of synthetic fibers which are designed to effectively absorb and/or transfer medicinal solution to affected tissue. Pledget 42 can include pads 42 which, again, are generally found in the art and manufactured with known techniques and methods. In one embodiment, pledget 42 can measure 5.72 cm (2.25 in) in diameter.

Pledget 42, like roll 34, can be designed such that surfaces 44, 46, and 48 allows pledget 42 to snugly fit into the sulci 16, 18 of hoof 10 to be self-retaining. Again, like roll 34, pledget 42 can stay in contact with damaged tissue unlike liquid treatments. Pledget 42 can be impregnated with medicinal solution, which is non-staining and remains in constant contact with affected tissue of hoof 10.

FIG. 4 depicts an example method of preparing a medicinal solution to treat the bacterial and/or fungal development associated with Thrush and White Line Disease. An acidified copper sulfate solution ($CuSO_4$) can be prepared which is impregnated into the applicators 34, 42 to form an effective medicinal delivery system. Copper sulfate is a fungicide used to control bacterial and fungal disease of the external tissues on a horses hoof 10, sole 24 and frog 20. The copper sulfate can be acidified with citric acid to form a copper sulfate pentahydrate. Copper sulfate powder or an acidified derivative of the copper sulfate powder as described can be used.

Aggregate acidified copper sulfate in powder form can be obtained from a commercial source (step 52). In an embodiment A, 453.6 grams of the copper sulfate powder is placed in a 6 liter plastic container. The copper sulfate powder can then be combined with water to form a solution (step 54). Embodiment A utilizes 5040 ml (168 fluid ounces) of distilled water to form the solution. Once dissolved the finished medicinal solution of embodiment A is a nine (9) percent solution of acidified copper sulfate.

The medicinal solution can be then impregnated into the applicators 34, 42 (step 56) using a variety of generally accepted methods. Again returning to embodiment A, 25 cotton dental rolls 34 can be positioned in the bottom of an 8 ounce polypropylene, straight sided jar with a height of 3 and 9/16 inch and a diameter of 23/32 inch. A second row of 25 dental rolls 34 can be placed on top of the first row. Four (4) ounces of the acidified copper sulfate solution can then be poured over the cotton dental rolls 34 to evenly distribute the solution to the cotton rolls 34. The container can then be capped and labeled.

In an alternative embodiment B using applicators 42, fifty (50) cotton pledgets 42 can be positioned in the bottom of the container described in embodiment A. Six (6) ounces of the acidified copper sulfate solution can then be poured over the pledgets 42 to evenly distribute the solution to the cotton pledgets 42. Again, the container can then be capped and labeled.

FIG. 5 depicts an example method of applying applicators 34, 42 in accordance with the delivery system just described. The caregiver first stands to the side of the horse, with the person facing the back end of the horse. The caregiver then bends down and picks up the hoof (step 60). Holding the hoof in one hand, the caregiver takes a hoof pick and cleans the hoof and sulci of the hoof and frog of all loose debris and dead tissue (step 62).

The caregiver then removes a single moistened cotton dental roll 34 or cotton pledget 42 from the container (step 64). The roll 34 or pledget 42 is placed over the affected area (step 66). A single roll 34 or pledget 42 is used for each area to be medicated. The caregiver presses the applicator 34, 42 into the sulci (or under the shoe or pad), with the hoof pick. The caregiver then presses the applicator 34, 42 just enough to ensure that a snug purchase is achieved (step 68). The caregiver then can release the hoof and allow the animal to resume full weight bearing on the hoof. The applicator 34, 42 is self-retaining and remains in place.

Figure 6:
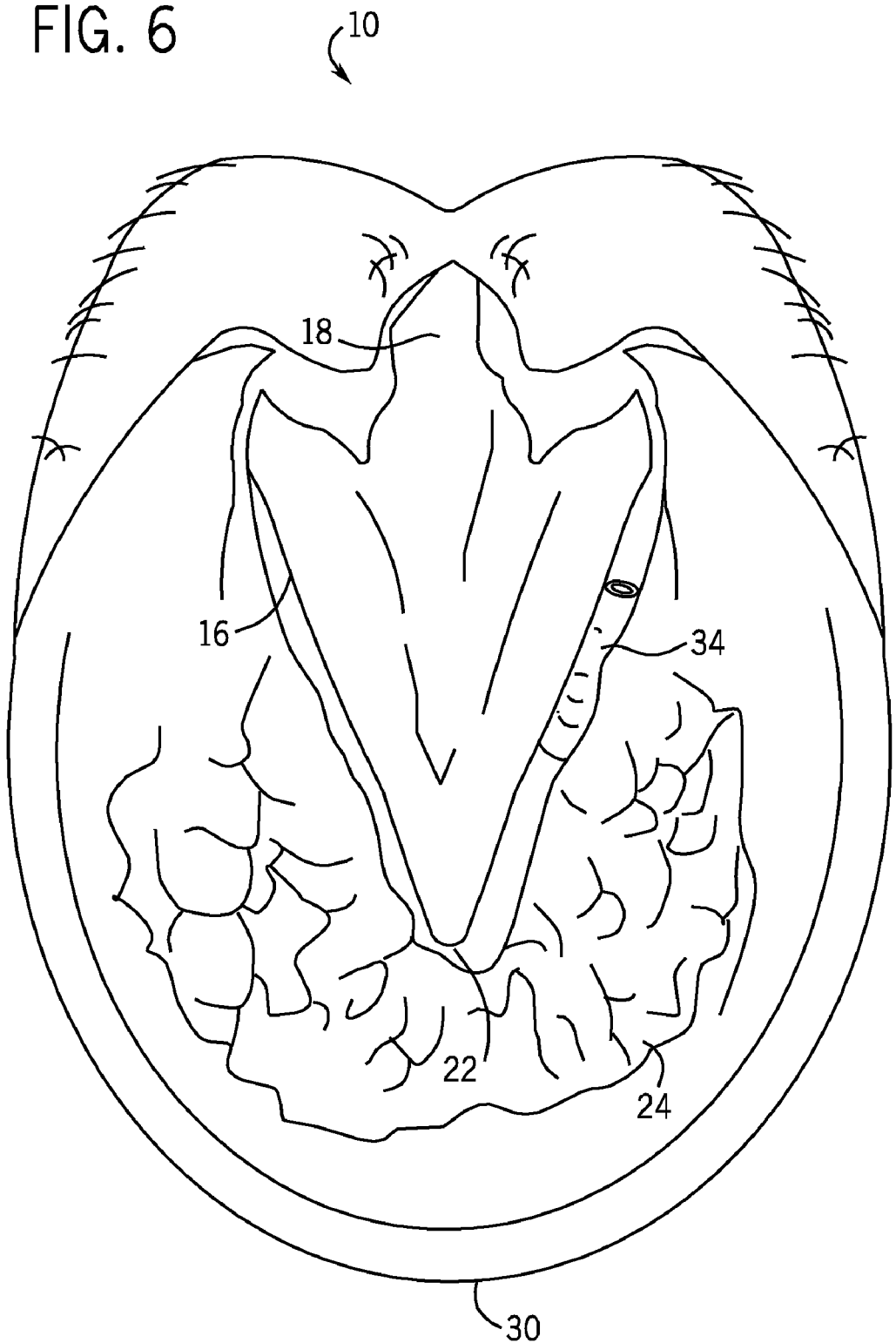
FIG. 6 illustrates an equine foot including an applicator device having the medicinal solution.

Turning to FIG. 6, a foot 10 having an applicator 34 positioned to treat damaged tissue is shown. Foot 10 again shows the apex 22 of frog 20, sole 24, and sulci 16, 18. Applicator 34 is shown positioned snugly in sulci 16.

The method for delivery as depicted in FIGS. 5 and 6 is unique in that no other product on the market to treat Thrush and White Line Disease provides the same benefits. The delivery system is unique because not only is the system less messy, but the delivery system is self retaining (in the sulci 16, 18 of the hoof 10 or under a shoe). The cotton rolls 34 or pledgets 42 are applied by placing them over the diseased tissue of the hoof 10 and pressing them into the crevice where the organisms are growing. The medicinal solution is light blue in color and does not stain. The method 58 of use has been clinically shown to work in three days or less.

In addition to treating Thrush and White Line Disease, applicators 34, 42 can be used as mild osmotics to treat necrotic or live tissues. Applicators 34, 42 can be mild drying agents for the hoof 10 and soft tissue structures. Applicators 34, 42 can also be used to harden and dry out structures of the hoof 10 that are too wet or moist, as well as reduce exhuberent granulation tissue.

While one or more embodiments of the present invention have been illustrated in detail, the skilled artisan will appreciate that modifications and adaptations to those embodiments may be made without departing from the scope of the present invention as set forth in the following claims.

What is claimed is:

1. An equine medicinal delivery system, comprising:
a dental roll impregnated with a copper sulfate solution for placement in an equine hoof.

2. The delivery system of claim 1, wherein placement in an equine hoof further includes placement in a sulci of the equine hoof.

3. The delivery system of claim 1, wherein the medicinal copper sulfate solution includes acidified copper sulfate.

4. The delivery system of claim 1, wherein the copper sulfate solution comprises an approximately 9% aqueous solution formed by combining acidified copper sulfate power with water.

5. The delivery system of claim 1, wherein the dental roll further comprises natural fibers.

6. The delivery system of claim 1, wherein the dental roll further comprises synthetic fibers.

7. The equine medicinal delivery system of claim 1, wherein the dental roll has a width of approximately 10 mm and a length of approximately 38 mm.

8. The delivery system of claim 1, wherein the dental roll is configured to transfer the copper sulfate solution to damaged tissue within the sulci of the equine hoof when disposed within the sulci of the equine hoof.

9. The delivery system of claim 8, wherein the copper sulfate solution includes acidified copper sulfate.

10. An equine medicinal delivery system for controlling bacterial and fungal disease within an equine hoof, comprising:
a dental roll impregnated with an acidified copper sulfate solution, wherein:
the dental roll is sized to fit within a sulci of the equine hoof; and
the dental roll is self-retaining within the sulci of the equine hoof when disposed within the sulci of the equine hoof.

11. The equine medicinal delivery system of claim 10, wherein the acidified copper sulfate solution is acidified using citric acid.

12. The equine medicinal delivery system of claim 10, wherein the dental roll is configured to transfer the acidified copper sulfate solution to damaged tissue within the sulci of the equine hoof when disposed within the sulci of the equine hoof.

13. The equine medicinal delivery system of claim 10, wherein the acidified copper sulfate solution comprises a 9% aqueous solution formed by combining acidified copper sulfate power with water.

14. The equine medicinal delivery system of claim 10, wherein the dental roll includes natural fibers.

15. The equine medicinal delivery system of claim 10, wherein the dental roll includes synthetic fibers.

16. The equine medicinal delivery system of claim 10, wherein the dental roll has a width of approximately 10 mm and a length of approximately 38 mm.

17. An equine medicinal delivery system for controlling bacterial and fungal disease within an equine hoof, comprising:
a dental roll impregnated with an acidified copper sulfate solution, wherein:
the dental roll is sized to fit within a sulci of the equine hoof;
the dental roll is self-retaining when disposed within the sulci of the equine hoof;
the dental roll is configured to transfer the acidified copper sulfate solution to damaged tissue within the sulci of the equine hoof when disposed within the sulci of the equine hoof; and
the acidified copper sulfate solution comprises a 9% aqueous solution formed by combining acidified copper sulfate power with water, wherein the acidified copper sulfate power is acidified using citric acid.

* * * * *